United States Patent [19]

Kunz

[11] Patent Number: 4,633,074
[45] Date of Patent: Dec. 30, 1986

[54] METHOD AND APPARATUS FOR FOCUSING A BEAM OF LIGHT ON AN OBJECT

[75] Inventor: Rino E. Kunz, Steinmaur, Switzerland

[73] Assignee: Gretag Aktiengesellschaft, Regensdorf, Switzerland

[21] Appl. No.: 616,254

[22] Filed: Jun. 1, 1984

[30] Foreign Application Priority Data

Jun. 1, 1983 [CH] Switzerland ............... 2987/83

[51] Int. Cl.$^4$ ............... G01J 1/20; G01C 3/08
[52] U.S. Cl. ............... 250/201; 356/4
[58] Field of Search ......... 250/201 AF, 204, 201 DF; 356/4; 354/402–409

[56] References Cited

U.S. PATENT DOCUMENTS

4,107,520 8/1978 Wilwerding ............... 250/204

Primary Examiner—Gene Wan
Attorney, Agent, or Firm—Burns, Doane, Swecker & Mathis

[57] ABSTRACT

Focusing of a light beam on an object is effected by two mutually complementary techniques: in the first technique the beam spot on the object is reproduced on several measuring diaphragms arranged at different distances from the image plane and the light not blocked by the measuring diaphragms is evaluated for the detection of the focal point. This technique is highly sensitive and reacts rapidly. It is used for the continuous setting and resetting of focusing. The second technique utilizes the phenomenon of "speckling". Herein the light back scattered by the beam spot is evaluated for its granulation and optimum focusing determined as a function of the maximum coarseness of granulation. This second technique is insensitive to alignment and is thus used to calibrate the first technique. Both methods together yield a highly sensitive, precise and stable focusing system satisfying all practical requirements to a high degree.

36 Claims, 19 Drawing Figures

METHOD AND APPARATUS FOR FOCUSING A BEAM OF LIGHT ON AN OBJECT

BACKGROUND OF THE INVENTION

The invention relates to a method and an apparatus for focusing a beam of light, in particular a laser beam, on an object by observation of the beam image on the object.

The processing of workpieces by means of laser beams is becoming increasingly important. One of the most essential problems in this context involves focusing the laser beam on the one hand onto the surface to be worked in an optimum manner and, on the other hand, to constantly maintain this focusing and to suitably adjust it.

The essential focusing requirements are rapidity, high sensitivity and maximum precision in one respect, and long term stability in the other.

It is accordingly an object of the invention to provide a method and apparatus satisfying the foregoing requirements.

The method and the apparatus according to the present invention to achieve this objective are described hereinafter in detail and set forth in the independent claims. Particularly appropriate and advantageous configurations and further details are set forth in the dependent claims.

Briefly, the invention is based on using a combination of two different focusing techniques, both of which detect and evaluate the light reflected by the beam spot on the object impacted by the light or laser beam, but in keeping with entirely different criteria. The two measuring techniques are suitably selected so that they complement each other and their respective inherent errors and shortcomings are mutually compensated for or become negligible.

For the continuous focus adjustment including follow-up regulation itself, one of the techniques described in DE No. 20 34 341, U.S. Pat. No. 3,689,159, DE No. 24 53 364, FR No. 94 871 or U.S. Pat. No. 3,614,456, may be used, wherein the beam spot is reproduced by means of an imaging objective on two or more diaphragms placed at different distances from the image plane or oscillating with respect to said image plane, and the light not shaded by the diaphragms is evaluated. The embodiments of these methods according to the invention, to be explained hereinbelow, are particularly appropriate and advantageous.

A technique utilizing the phenomenon of the so-called "speckling" (granulation of the light reflected by the beam spot) is particularly suitable for calibration; it will be described more fully hereinafter. The physical phenomenon of "speckling" is described for example in the following references:

R. K. Erf: "Speckle Metrology", Academic Press (1978)

J. C. Dainty: "Laser Speckle and Related Phenomena", Springer Verlag (1975)

K. A. Stetson: "A Review of Speckle Photography and Interferometry", Opt. Eng. 14, 482 (1975)

J. C. Dainty: "The Statistics Of Speckle Patterns", Progress In Optics, Vol. 14, pp. 3–46 (1976).

The principal applications of "speckle" methods heretofore have been the characterization of surfaces and the measurements and displacements of test objects. In the context of focusing laser beams, however, speckle methods have not been mentioned heretofore.

The principal advantage of focusing by the "speckle" method consists of the fact that the method is entirely insensitive with respect to the adjustment of the optical components. The focusing method therefore represents an ideal supplement of the first mentioned focusing methods, which are highly critical in this respect.

BRIEF DESCRIPTION OF THE DRAWINGS

The foregoing and other objects and advantages of the present invention shall become apparent to one skilled in the art to which the invention pertains from the following detailed description when read in conjunction with the appended drawings in which.

DETAILED DESCRIPTION

Figure 9:
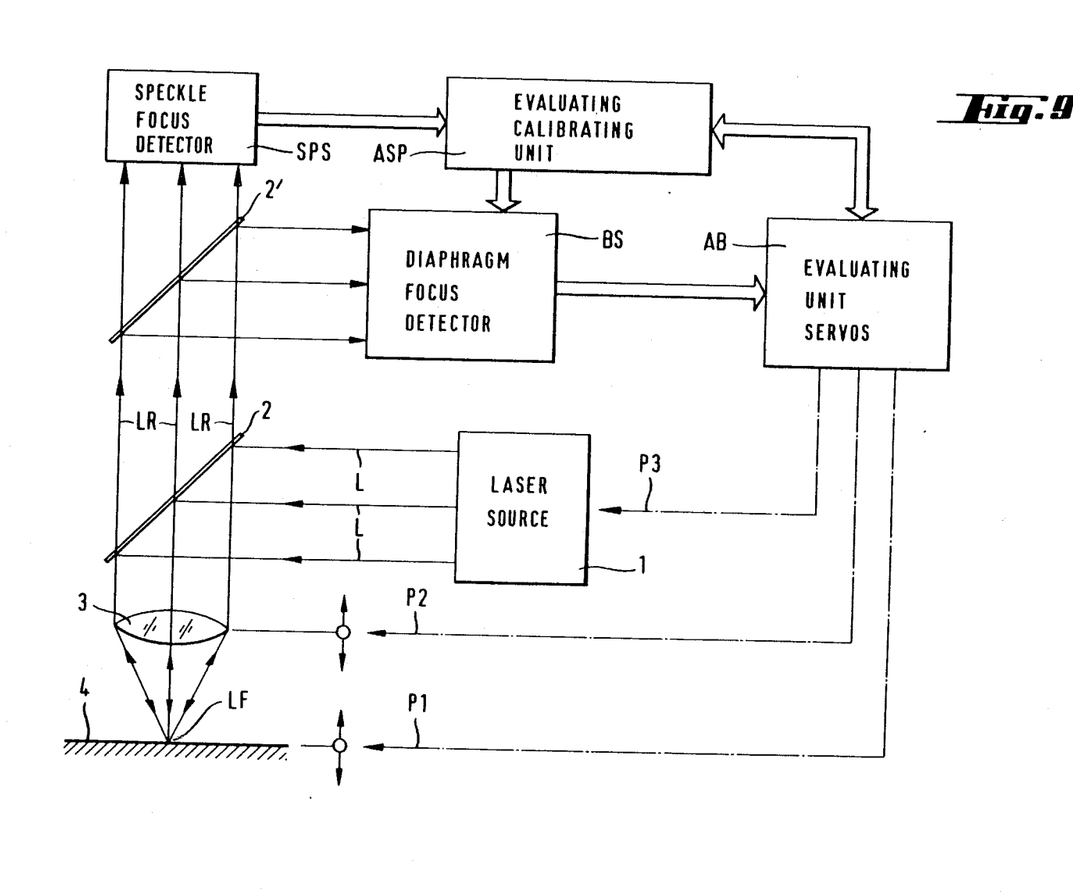
FIG. 9 is a schematic representation of an apparatus according to the invention with two focusing systems.

The laser processing apparatus shown schematically in FIG. 9 corresponds in its fundamental configuration with the known state of the art as described for example in aforementioned U.S. Pat. No. 3,689,159, so that the following description may concentrate on parts that are central to the present invention.

The apparatus shown comprises a laser source 1, projecting a laser beam L by means of a conventional semipermeable mirror 2 and a focusing lens 3 onto a workpiece or object 4 to be processed and creating a beam spot LF on the object. The beam spot LF will vary in size as a function of the state of focus. Laser light LR reflected by the beam spot LF arrives by way of the focusing lens 3 and the semipermeable mirror 2 and a beam splitter mirror 2' at two focusing detector systems BS and SPS, respectively, which in turn are connected with the appropriate electronic evaluating and servo systems ASP and AB, respectively. The servo system acts through connections indicated by the arrows P1, P2 and P3 on the relative positions of the object 4 and/or of the focusing lens 3 and, if desired, on the laser source 1 itself, thereby forming a closed-loop control circuit.

Further details of the configuration and mode of operation of a preferred form of the focus detector system BS will become apparant from the description below of FIGS. 1-8, wherein like numerical designations have been utilized to indicate elements previously mentioned.

Figure 1:
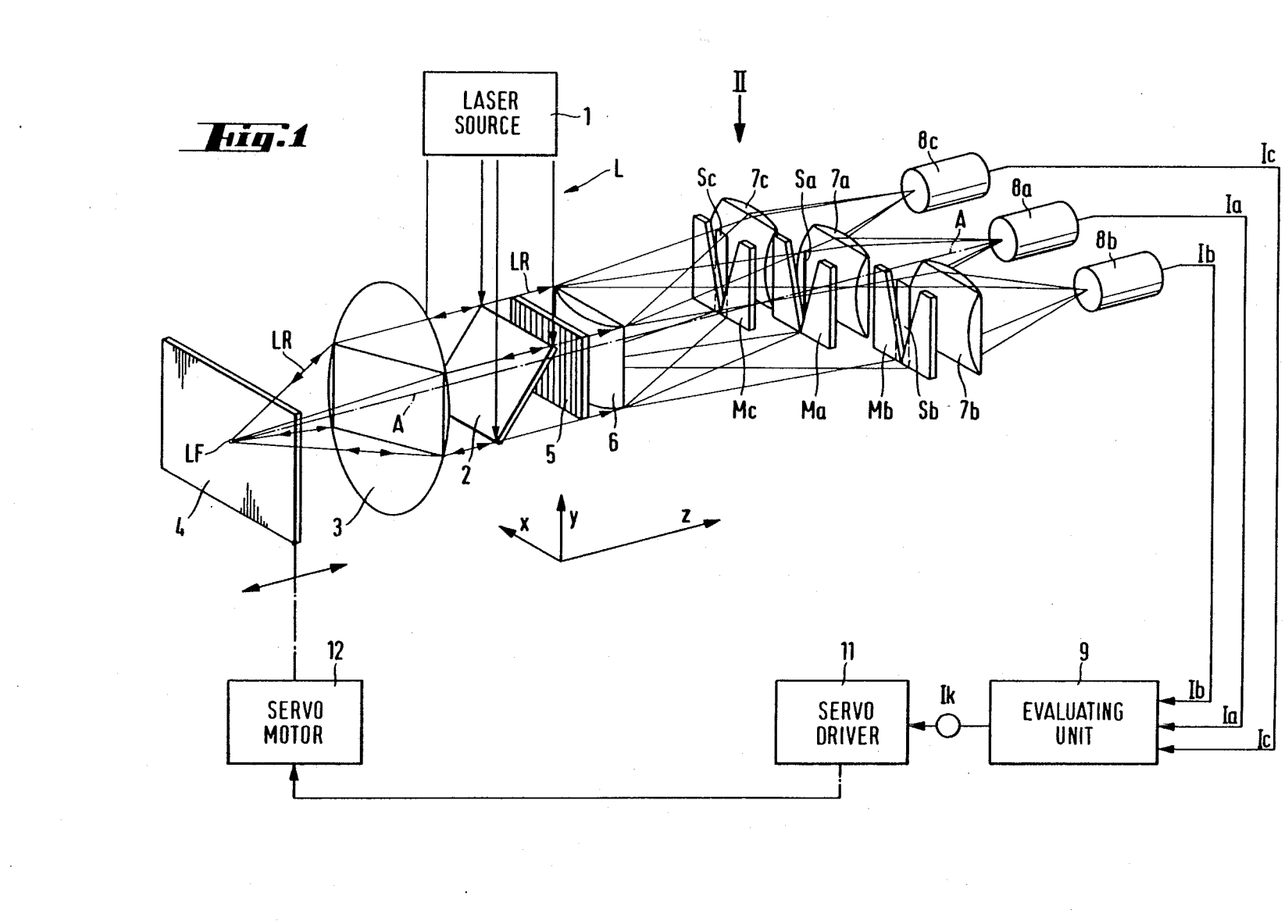
FIG. 1 is a schematic illustration of a laser processing apparatus with a focusing system operating with fixed measuring diaphragms.

The layout represented in FIG. 1 shows, for the sake of clarity, only one focusing apparatus. The apparatus shown comprises a source 1 of laser light which is projecting a laser beam L by means of a semipermeable mirror 2 and a focusing lens 3 onto a workpiece or object 4 to be processed and producing thereon a beam spot LF varying in size as a function of the state of focus. The laser light LR reflected by the beam spot LF arrives by way of the focusing lens 3 and the semipermeable mirror 2 (as well as an appropriate beam splitter 2', not shown, if necessary) on an optical device consisting of a diffraction grating (ruled grating) 5 and a cylinder lens 6. The optical device splits the beam into three parts and reproduces the beam spot LF simultaneously on three measuring diaphragms Ma, Mb and Mc, offset with respect to each other laterally and in the direction of the optical axis A (Z axis), in the form of three stripes or lines Sa, Sb and Sc, which here are vertical. The light passing through the measuring diaphragms, i.e. not blocked by them, is then directed by means of three further cylinder lenses 7a, 7b and 7c onto three photoreceivers 8a, 8b and 8c, respectively, and is measured by them. The electrical signals corresponding to the intensities Ia, Ib and Ic of the light measured are functions of the focus setting and are supplied to an evaluating stage 9, which generates from them a correction signal Ik characteristic of the prevailing focus state. This signal is then used by an adjusting device consisting of a servodriver 11 and a servomotor 12 to displace the workpiece 4 in the direction of the z axis relative to the focusing lens 3, until the optimum focus setting is attained. Obviously, it is also possible to shift the focusing lens relative to the workpiece as mentioned in connection with FIG. 9.

Figure 2:
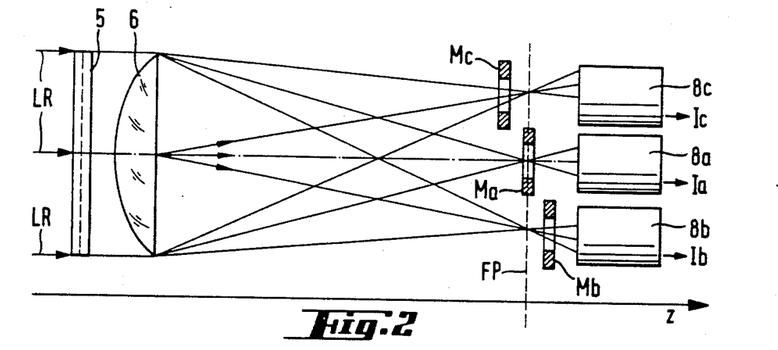
FIG. 2 illustrates a portion of the apparatus of FIG. 1 to assist in the comprehension thereof in a different representation.

FIG. 2 shows a portion of the apparatus according to FIG. 1 in a top view, with the cylinder lenses 7a-7c eliminated for the sake of simplicity. It is seen that the three measuring diaphragms Ma-Mc, aside from their lateral offset, are offset with respect to each other in the z direction, i.e. the direction of the optical axis of the system. The measuring diaphragm Ma is located exactly in the image or focus plane FP of the system, wherein the image of the beam spot LF is generated, when the laser beam L is focused exactly or optimally on the object 4; the position of this image plane FP is designated hereafter as the desired position. The measuring diaphragm Mb is located slightly behind the measuring diaphragm Ma and the desired position FP, respectively, and the measuring diaphragm Mc symmetrically in front.

The mode of operation of the three measuring diaphragms Ma-Mc is illustrated in FIGS. 3a-3d. Each measuring diaphragm is provided with a V-shaped diaphragm orifice 13, arranged symmetrically with respect to the associated image Sa, Sb, Sc of the beam spot LF. The representations of FIGS. 3a-3c corresponds to the condition of optimum focus setting. The image Sa of the beam spot LF is generated exactly at the location of the diaphragm Ma and is practically in an ideal line form, so that there is practically no blockage of the image Sa by the measuring diaphragm Ma. The corresponding measuring signal Ia of the photoreceiver 8a is therefore at a maximum. The two other diaphragms 8b and 8c are located outside the exact image plane, so that the images Sb and Sc of the beam spot appear on them as relatively wide stripes. As the result of the form of the diaphragm orifices 13 therefore, an increased part of the light is blocked with increasing widths of the stripes and the measuring signal Ib and Ic, respectively, of the associated photoreceivers becomes correspondingly smaller.

The situation, when the laser beam L is not focused accurately on the workpiece 4, is analogous. In this case, the three images Sa-Sc of the beam spot LF are generated not exactly in the desired position FP, but either in front of or behind it. Correspondingly, the measuring signals Ia-Ic of the three photoreceivers 8a-8c will assume values intermediate their possible extreme values. FIG. 3d shows the variations of the three measuring signals Ia-Ic as function of the displacement of the actual image plane of the three beam spot images with respect to the desired position and thus simultaneously as a function of the state of focus. The abcissa points Pc, Pa and Pb mark the positions of the three measuring diaphragms Mc, Ma and Mb.

It follows from the above, that the prevailing state of focus of the beam spot on the workpiece may be derived from the magnitude of the three measuring signals Ia-Ic. If Ic is larger than Ib, the object 4 is located too far from the focusing lens 3. If conversely Ib is larger than Ic, it is too close to the lens 3. The point of optimum focus is attained when the two measuring signals Mb and Mc are of equal magnitude and the measuring signal Ma is at a maximum. It is further apparent that in principle two measuring diaphragms would suffice for the determination of the deviation from the optimum focus point relative to direction and magnitude. But the use of a third measuring diaphragm in the desired position makes it possible to obtain improvements in the variation of the characteristic line and compensation of certain interferences, such as variations in the beam intensity or the surface characteristics of the object 4.

The correction signal Ik that is characteristic of the state of focus may be calculated in the evaluating stage 9 approximately by the formula $Ik=Ib-Ic$ when two measuring diaphragms Mb and Mc are used, and approximately by the formula $Ik=(Ib-Ic)/Ia$, when all three measuring diaphragms Ma-Mc are applied.

Figure 3A:
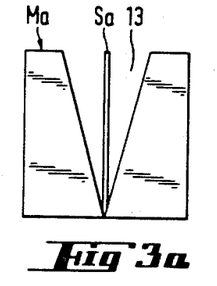
FIGS. 3a–3d are illustrations to assist in understanding the mode of operation of the measuring diaphragms of FIG. 1.
Figure 3B:
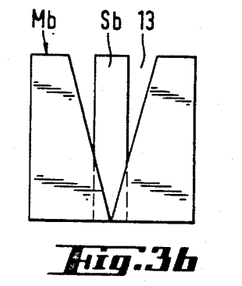
Figure 3C:
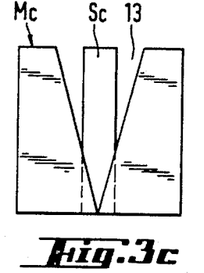
Figure 3D:
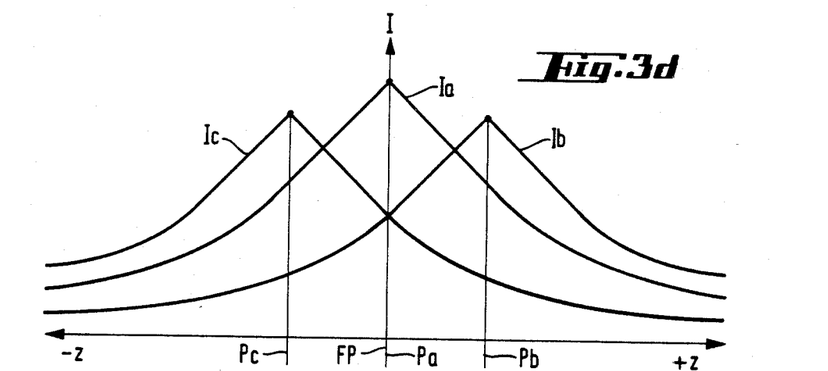

As shown in FIG. 3d, the relationship of the measuring signal and the state of focus is essentially linear in the vicinity of the point of optimum focus, when V measuring diaphragms according to FIGS. 3a-3c are used. The correction signal Ik behaves in a similar manner, while its slope and thus the sensitivity of the system in the vicinity of the focus point may be adapted to various practical requirements, by a suitable configuration of the measuring diaphragms. Obviously, nonlinear characteristics may be effected by a suitable configuration of the measuring diaphragms and the choice of optical imaging (for example spherical lenses).

Figure 4A:
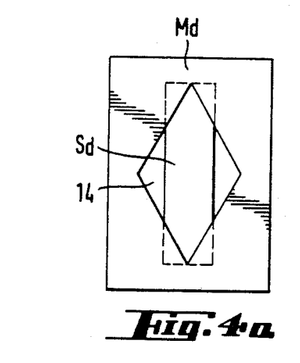
FIGS. 4a–4c are three examples of possible shapes of measuring diaphragms useful in conjunction with the embodiment of FIG. 1.
Figure 4B:
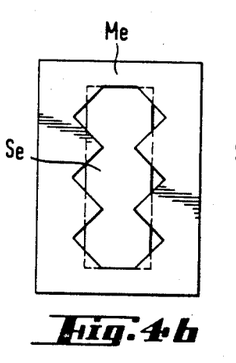
Figure 4C:
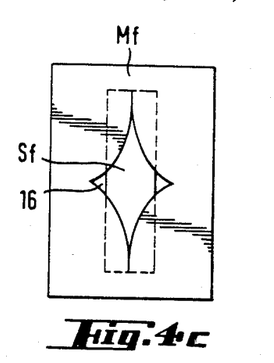
Figure 5A:
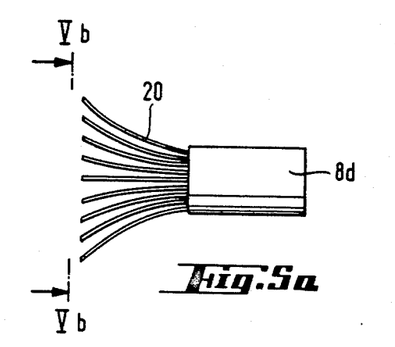
FIGS. 5a and 5b illustrate an alternative embodiment of a measuring diaphragm.
Figure 5B:
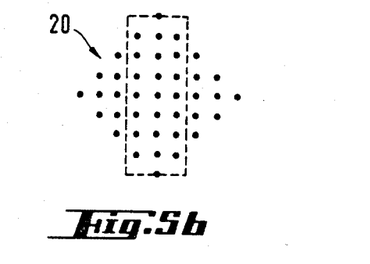

FIGS. 4a-4c show three further possible embodiments of the measuring diaphragms. The diaphragm according to FIG. 4a has a rhombic diaphragm orifice 14 and yields a characteristic twice as steep as the V measuring diaphragms according to the preceding description. The same is true for the measuring diaphragm Me in FIG. 4b with the difference that it has a nonadjusting dead zone to a certain minimum deviation from optimum focusing. The measuring diaphragm Mf according to FIG. 4c finally has a diaphragm orifice 16 bounded by convex edges and yields a characterictic curve that is particularly steep in the vicinity of the optimum focal point.

In the foregoing, only transmitting measuring diaphragms were mentioned. It is evident that reflecting measuring diaphragms may also be suitable for the invention. Furthermore, the diaphragms may naturally be embodied by a suitably shaped inlet window of the photoreceivers or an appropriate configuration or arrangement of the photoreceivers themselves or by means of a certain light conductor layout, or the like. The latter is shown as an example in FIGS. 5a and 5b, wherein a bundle of optical conductors is arranged so that the light inlet surfaces of all of the individual conductors are in one plane and have for example the configuration shown in FIG. 5b. The other ends of the optical conductors lead to the photoreceiver 8d. This optical guidance arrangement is equivalent for example to the measuring diaphragm according to FIG. 4a. Finally, in place of the diaphragms, so-called graded filters of a suitable geometry may also be used.

It is further understood that the splitting of the reflected laser light LR into three beams must not necessarily be effected by means of a diffraction grating. Obviously, other means, such as beam dividers or prisms or, the like, may be used. Furthermore, the beam spot LF is not necessarily imaged in the form of a line or a stripe, but naturally any other geometric form is possible. However, imaging in the form of a line has been found to be especially appropriate relative to the control behavior of the entire system.

A particularly advantageous and elegant form of the reproduction of the beam spot LF consists of the use of a hologram or a holographic optical element, respectively. As a hologram is capable of performing several optical functions simultaneously, a particularly compact configuration of the apparatus is possible. This is demonstrated in FIG. 6, by the example of an embodiment of the apparatus according to the invention equipped with two photoreceivers only.

The light LR reflected by the beam spot arrives by means of a focusing lens 3, not shown, and a mirror 2 at a holographic optical element HOE. The latter moldulates the light and produces two line or stripe shaped images of the beam spot. These images may be located in different planes, in which case it is not necessary to operate, as in FIGS. 1 and 2, with axially offset measuring diaphragms. In the example according to FIG. 6, the two images are located offset with respect to each other and the two measuring diaphragms Mg and Mh are in a plane between the two image planes of the beam spot. The light passed by the two measuring diaphragms impacts the two photoreceivers 8g and 8h, the measuring signals Ig and Ih whereof are then further processed in accordance with the foregoing.

Figure 7:
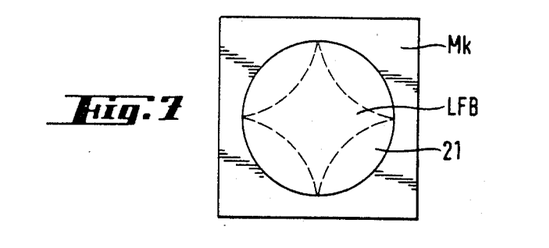
FIG. 7 illustrates a detailed variant of the embodiment of FIG. 6.

With the aid of the holographic optical element or hologram HOE the geometric form of the beam spot may further be effected or chosen so that the measuring diaphragms may be made very simple or even omitted. In FIG. 7 this is shown by an example wherein the image of the beam spot LFB has an approximately star like configuration and the diaphragm orifice of diaphragm Mk is circular.

Figure 8:
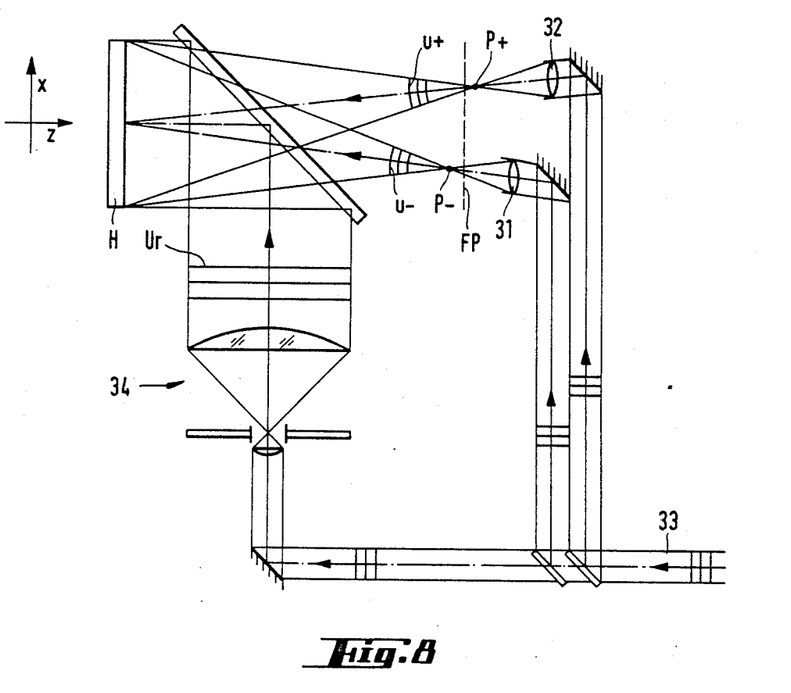
FIG. 8 is a general diagram illustrating the preparation of a holographic element for the embodiment according to FIG. 6.

The hologram may be produced by conventional means and is described below purely as an example for a hologram producing two image points offset in the axial direction (and transversely), with the aid of FIG. 8.

To produce a hologram with two image points $P_+$ and $P_-$ arranged in space, it is merely necessary to record the interference pattern of spherical waves $u_+$ and $u_-$ with a planar reference wave Ur on a plate H coated with a photosensitive recording material. The two spherical waves $u_+$ and $u_-$ are produced by means of two lenses 31 and 32 with the points $P_+$ and $P_-$ as the focal points from a laser beam 33. Similarly, the planar reference wave Ur is derived from the laser beam 33 by means of a beam expander 34.

Figure 6:
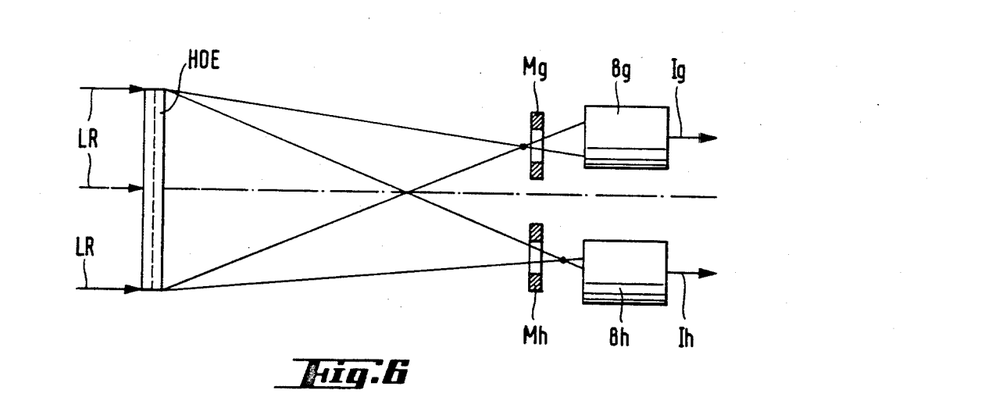
FIG. 6 illustrates a second example of an embodiment of the apparatus according to FIG. 1.

The photographically developed and fixed hologram plate H may now be used as the holographic optical element HOE in the apparatus according to FIG. 6 and furnishes when illuminated from the opposite side (from the left in FIG. 8) the two images of the beam spot desired.

Figure 11:
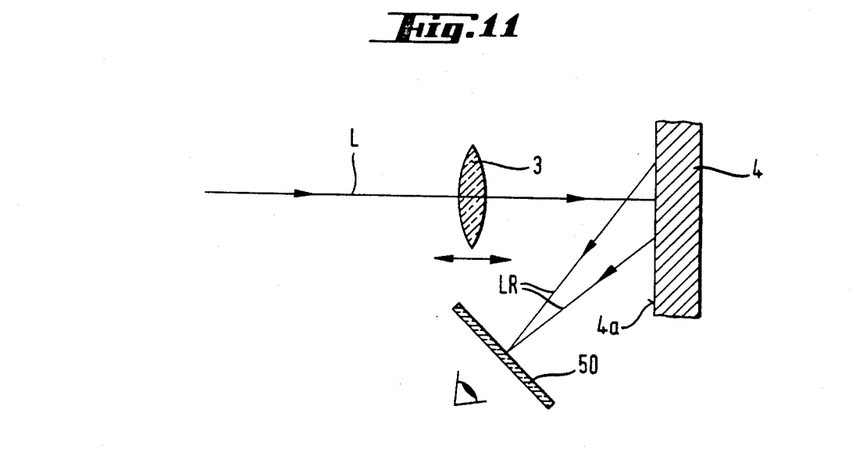
FIGS. 11 and 12 illustrate a general diagram of two, for example optical, layouts for focusing by the speckle method; and, FIG. 13 is a general diagram of a further variant of an optical layout for focusing by the speckle method.
Figure 12:
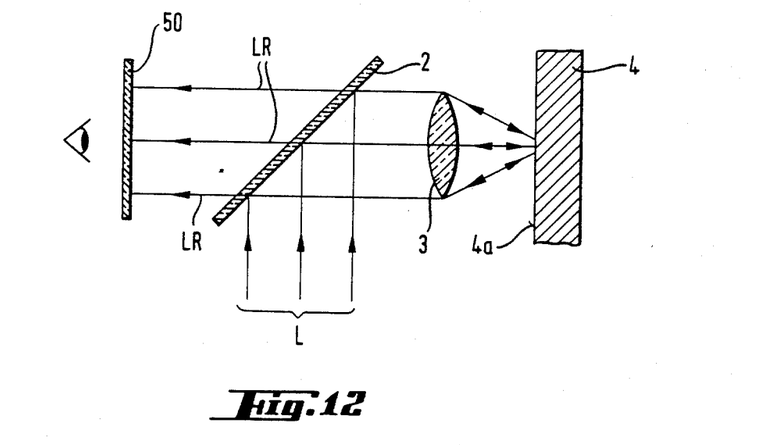
Figure 13:
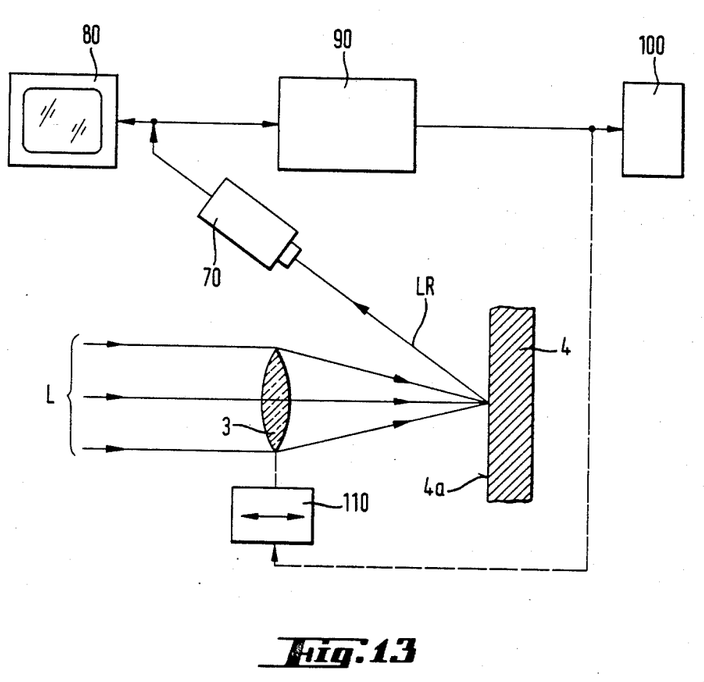

FIGS. 11 to 13 illustrate a preferred form of the second focusing technique used in the apparatus according to the invention in combination with the first focusing technique. The technique illustrated in FIGS. 11-13, utilizes the physical phenomenon of "speckling".

In the simplest arrangement according to FIG. 11 the surface 4a of the object or workpiece 4 to be processed is exposed to the laser beam L focused by means of the focusing optics 3 and the light LR back scattered by the object surface 4a is intercepted on a laterally arranged screen 50.

In the embodiment according to FIG. 12 the laser beam L arrives by way of the semipermeable mirror 2 and the focusing optics 3 on the object surface 4a and the back scattered light LR again impacts the screen 50 by way of the mirror 2.

The intensity distribution of the light back scattered by the illuminated spot observed on the screen 50 exhibits a granulation with statistically distributed bright and dark spots. This granulation, which in general is designated by the term "speckle" or "speckling", originates on the surface 4a of the object 4 which in practice always has a certain (optical) roughness, which spatially modulatesthe phase of the illuminating light wave in a statistical manner (optical noise). The magnitude of the individual bright and dark spots, i.e. the coarseness or fineness of the granulation, depends on the size of the illuminated spot on the object surface and increases (i.e. coarser granulation) with a decreasing size of the surface illuminated.

The invention utilizes this phenomenon by employing the speckle structure as an indicator of focusing. As the smallness of the illuminated spot is directly related to focusing (ideal focusing equals minimum spot diameter), according to the invention focusing is adjusted while observing the granulation, i.e. the speckles, on the screen 50 until granulation is at its coarsest. It is evident that during this adjustment the intensity, i.e. the power of the laser beam is reduced so that no unintential working of the surface of the workpiece 4a takes place.

When visible light is used, the direct visual observation of the speckles on the screen 50 is readily possible, but observation with photoelectrical means and subsequent evaluation of the electrical signals generated is universal and more advantageous. FIG. 13 shows a schematic view of a suitable device for such evaluation.

In FIG. 13 the laser beam L again impacts through the focusing optics 3 the surface 4a of the workpiece and is back scattered from there. The scattered light LR is received by a television camera 70 connected to a television monitor 80 and an evaluating device 90. The television camera 70 is of a conventional, commercial type with its objective removed, so that the scattered light directly impacts the television tube. Instead of removing the objective, it may be advantageous in certain cases to merely strongly defocus the objective.

The camera 70 scans the speckle pattern generated by the illuminated spot line-by-line and produces a corresponding video signal which additionally contains the usual synchronizing pulses. The speckle image taken by the camera 70 is displayed on the monitor 80 for optical inspection.

The evaluating device 90 conventionally utilizes the video signal produced by the camera directly to detect the state of optimum focusing, which is then indicated on a display 100 in a suitable manner.

As a measure of the coarseness of the speckle image, for example the number of bright-dark transitions per line of image may be used. Therefore, it is merely necessary for focusing to measuring the number of these transitions and minimize it by the appropriate shifting of the focusing optics 3 (or the workpiece 4).

For the evaluation of the video signal in this sense, initially the synchronizing pulses are eliminated and then the signal amplitude compared by means of a Schmitt trigger with a reference level, obtained from the mean value of the signal over one or several image lines and continuously adjusted. The rectangular signal produced by the Schmitt trigger is converted into a corresponding voltage and displayed, wherein the minimum voltage corresponds to the state of the best focusing. The precision and freedom from interference of the evaluation may be increased by transforming the signal in front of the Schmitt trigger by means of suitable transmission elements (band pass, differentiating element).

In the foregoing, merely a simple example of photoelectric speckle observation and evaluation has been explained. Naturally, the analysis of the speckle image may be effected in numerous other conventional ways. It is readily possible for example to scan the speckle image, rather than with a television tube, generally with a two-dimensional planar photoreceiver layout only along one image line, for example, by means of a linear photodiode device or, in an extreme case with a single photodiode only. It is merely essential that the spatial intensity modulation of the scattered light varying with the state of focus be quantified in some manner and, optionally, displayed. It is further possible not to vary the focusing directly until the coarsest speckle pattern is obtained, but to observe the variation of the coarseness of the speckle pattern in several focus settings and to determine the best focus settings by calculation, whereupon it may be adjusted manually or automatically.

Aside from more convenience and, above all, the more accurate observation of the speckles, photoelectric evaluation has the advantage over visual observation that the wavelength of the laser beam must not necessarily be within the visible range of the spectrum. Furthermore, it is possible to combine the evaluating device 9 with adjusting means 110 into a closed control circuit for fully automatic focusing.

The laser working apparatus according to the invention, schematically shown in FIG. 9 comprises, as mentioned above, two focusing systems BS and SPS. One system BS operates with stationary measuring diaphragms such as is shown in FIGS. 1-8 and serves, together with the evaluating and servo installation AB, the continuous setting and resetting of the focusing. The other system SPS is a speckle system such as that shown in FIG. 13 and serves to calibrate the measuring diaphragm system BS. The evaluating device ASP, in the form of a microprocessor, is configured and cooperates in a conventional manner with the evaluating device AB so that it automatically calibrates the system of measuring diaphragms following the determination of the optimum focal point.

Figure 10:
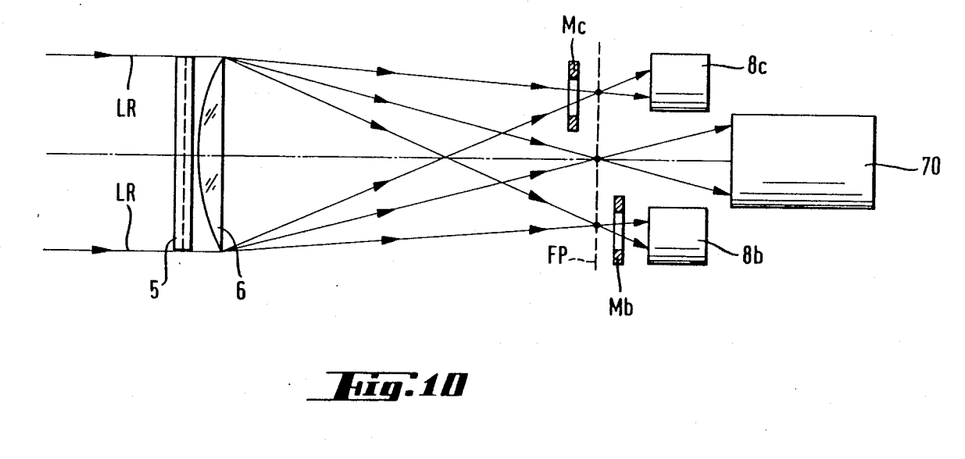
FIG. 10 illustrates a particularly appropriate detail variant of the apparatus according to FIG. 9.

In FIG. 10, a particularly appropriate, compact optical layout for the practical implementation of the two focusing systems is shown. It corresponds essentially to the layout of FIG. 2, with the exception that in place of the center measuring diaphragm the photoreceiver 70 of the speckle detection system is provided. The zero order diffraction diagram thus impacts the speckle detector, while the diffraction diagrams of higher order are used for evaluation by means of measuring diaphragms.

In the drawings in each case only two focusing systems are shown. Obviously, the apparatus could comprise several focusing systems, which for example evaluate the diffraction diagrams of the beam spot of different order in accordance with different criteria.

The apparatus described is characterized by the highest precision within a wide setting range of $<1$ $\mu$m to $>1$ mm, it is insensitive to external interference, independent of the polarization and angular distribution of the light, suitable for planar and nonplanar surfaces with practically arbitrary properties, requires no additional auxiliary light sources and is relatively simple and compact in construction.

In order to obtain the highest degree of sensitivity and stability it is important to design the individual optical channels of the focusing system as similar as possible in relation to external interference. The splitting according to the invention of the reflected light by means of a diffraction grating or a corresponding holographic element insures this to the greatest extent. In this manner, the highest homogeneity and symmetry of the individual optical channels are attained.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Moreover, variations and changes may be made by those skilled in the art without departing from the spirit of the present invention.

What is claimed is:

1. A process for focusing a beam of light, in particular a laser beam, which produces a spot on an object, through observation of light reflected by the beam spot on the object comprising the step of combining two complementary focusing techniques, one of which continuously adjusts focusing of the beam of light and the other of which periodically calibrates the one focusing technique.

2. The process according to claim 1. wherein, in said one focusing technique, at least three images of the beam spot are produced on the object by means of an optical system and a measuring diaphragm is associated with each of said images in different positions relative to the prevailing desired position of the image of the beam spot when optimally focused, and wherein said process includes evaluating the intensity of the light not blocked by the diaphragms, whereupon the focus is adjusted.

3. The process according to claim 2 including the step of producing the at least three images of the beam spot by means of a diffraction grating or an equivalent holographic optical element.

4. The process according to claim 3 including reproducing the beam spot with a cylinder lens in the form of a strip of light varying in width as a function of the state of focus, on the measuring diaphragms.

5. The process according to claim 2. including reproducing the beam spot in the form of a shaped image varying in size in accordance with the state of focus of the light beam on the object.

6. The process according to claim 2 including the step of producing three images of the beam spot, with one of the diaphragms being arranged in front of, one of the diaphragms essentially in and one of the diaphragms behind the desired position of the image of the beam spot at optimum focus.

7. The process of claim 3 including the step of producing three images of the beam spot, with one of the diaphragms being arranged in front of, one of the diaphragms essentially in and one of the diaphragms behind the desired position of the image of the beam spot at optimum focus.

8. The process of claim 4 including the step of producing three images of the beam spot, with one of the diaphragms being arranged in front of, one of the diaphragms essentially in and one of the diaphragms behind the desired position of the image of the beam spot at optimum focus.

9. The process according to claim 1 herein said other technique includes evaluating the granulation of light back scattered by the surface of the object and adjusting as a function of the coarseness of the granulation.

10. The process of claim 2 wherein said other technique includes evaluating the granulation of light back scattered by the surface of the object and adjusting focus as a function of the coarseness of the granulation.

11. The process of claim 3, wherein said other technique includes evaluating the granulation of light back scattered by the surface of the object and adjusting as a function of the coarseness of the granulation.

12. The process of claim 5 wherein said other technique includes evaluating the granulation of light back scattered by the surface of the object and adjusting focus as a function of the coarseness of the granulation.

13. The process according to claim 9 wherein focus is set at the maximum coarseness of the granulation.

14. The process according to claim 9 wherein the focus setting at maximum coarseness is calculated from the variation of coarseness of the granulation and then focus is set accordingly.

15. The process according to claim 9 wherein the back scattered light is scanned by a photoreceiver and converted into corresponding electrical signals, and the electrical signals are evaluated for the optionally automatic adjustment of focusing.

16. The process according to claim 13 wherein the back scattered light is scanned by a photoreceiver and converted into corresponding electrical signals, and the electrical signals are evaluated for the optionally automatic adjustment of focusing.

17. The process according to claim 14 wherein the back scattered light is scanned by a photoreceiver and converted into corresponding electrical signals, and the electrical signals are evaluated for the optionally automatic adjustment of focusing.

18. Apparatus for focusing a beam of light, in particular a laser beam, which produces a spot on an object impacted by the beam of light, comprising a combination of two mutually complementary focusing systems which evaluate light reflected from the beam spot on the object and which use independent criteria to determine a state of focus, wherein one focusing system performs continuous setting and resetting of focus and the other focusing system periodically calibrates said first system.

19. Apparatus according to claim 18 wherein the entire first focusing system comprises an optical system producing at least three images of the beam spot on the object, two measuring diaphragms associated with respective ones of the images and arranged in different positions relative to the prevailing desired position of the image of the beam spot at optimum focus, and opto-electrical means for measuring the light not blocked out by the measuring diaphragms and for producing from it a signal characteristic of the state of focus.

20. Apparatus according to claim 19 wherein the optical system comprises a diffraction grating or an equivalent holographic optical element.

21. Apparatus according to claim 19 characterized in that the optical system reproduces the beam spot in the form of a strip of light on the measuring diaphragms, with the width of said strip of light varying as a function of the state of focus.

22. Apparatus according to claim 20 characterized in that the optical system reproduces the beam spot in the form of a strip of light on the measuring diaphragms, with the width of said strip of light varying as a function of the state of focus.

23. Apparatus according to claim 19 including adjusting means automatically optimizing the focusing of the object in keeping with the characteristic signal produced by the opto-electrical means.

24. Apparatus according to claim 22 including adjusting means automatically optimizing the focusing of the object in keeping with the characteristic signal produced by the opto-electrical means.

25. Apparatus according to claim 19 wherein three measuring diaphragms are present, wherein one of the diaphragms is arranged in front of, one diaphragm essentially in and one diaphragm behind the desired position of the beam spot at optimal focus.

26. Apparatus according to claim 18 wherein the other focusing system comprises a photoreceiver impacted by the light back scattered from the surface of the object, the photoreceiver being connected to an electronic evaluating device which produces an output signal corresponding to the coarseness of the granulation of the back scattered light.

27. Apparatus according to claim 26 wherein an adjusting device cooperates with the evaluating device and setting the focusing of the beam of light to the maximum coarseness of the granulation of the back scattered light, is provided.

28. Apparatus according to claim 26 wherein the photoreceiver is a two-dimensional layout of a plurality of photodiodes or the like, or a video camera.

29. Apparatus according to claim 26 wherein the photoreceiver comprises means for line-by-line scanning of the back scattered light.

30. Apparatus according to claim 26 wherein the evaluating device calculates the focal setting corresponding to the greatest coarseness of granulation from the variation of coarseness.

31. Apparatus according to claim 18 including an automatic calibrating device for calibrating the first focusing system automatically in keeping with the optimum focal setting determined by said other focusing system.

32. Apparatus according to claim 19 including an automatic calibrating device for calibrating the first focusing system automatically in keeping with the optimum focal setting determined by said other focusing system.

33. Apparatus according to claim 26 including an automatic calibrating device for calibrating the first focusing system automatically in keeping with the optimum focal setting determined by said other focusing system.

34. Apparatus according to claim 19 wherein the other focusing system comprises a photoreceiver impacted by the light back scattered from the surface of the object, the photoreceiver being connected to an electronic evaluating device which produces an output signal corresponding to the coarseness of the granulation of the back scattered light and including an automatic calibrating device for calibrating the first focusing system automatically in keeping with the optimum focal setting determined by said other focusing system.

35. Apparatus according to claim 26 wherein the entire first focusing system comprises an optical system producing at least two images of the beam spot on the object, two measuring diaphragms associated with respective ones of the images and arranged in different positions relative to the prevailing desired position of the image of the beam spot at optimum focus, and opto-electrical means for measuring the light not blocked out by the measuring diaphragms and for producing from it a signal characteristic of the state of focus and wherein the diffraction grating or the equivalent holographic optical element produces at least three images of the beam spot and the photoreceiver of the said other focusing system with light of at least one of said three images.

36. Apparatus according to claim 35 wherein the diffration grating or the holographic optical element produces a diffraction diagram of zero order and two diffraction diagrams of the first order and that the photoreceiver of the said other focusing system is impacted by light of the zero order diffraction diagram.

* * * * *